United States Patent [19]
Yoshikawa et al.

[11] 3,962,073
[45] June 8, 1976

[54] PROCESS FOR TREATING A WASTE LIQUID OF HYDROSULFITE

[75] Inventors: Yoshio Yoshikawa, Ushiku; Sadao Otsuka, Nagareyama; Akira Amemiya; Toshio Komatsu, both of Tokyo, all of Japan

[73] Assignee: Mitsubishi Gas Chemical Company, Inc., Tokyo, Japan

[22] Filed: Aug. 9, 1974

[21] Appl. No.: 496,090

[30] Foreign Application Priority Data
Aug. 15, 1973 Japan.................................. 48-91435

[52] U.S. Cl...................................... 210/7; 210/18; 210/63 R
[51] Int. Cl.².............................................. C02C 1/06
[58] Field of Search ................... 210/11, 12, 15, 59, 210/63, 50, 18, 4–7; 423/514, 515, 512, 544, 547, 551

[56] References Cited
UNITED STATES PATENTS

| | | | |
|---|---|---|---|
| 3,186,942 | 6/1965 | Benger | 210/63 |
| 3,627,676 | 12/1971 | Eccles, Jr. | 210/15 |
| 3,718,732 | 2/1973 | Winslow, Jr. et al. | 423/515 |

FOREIGN PATENTS OR APPLICATIONS

| | | | |
|---|---|---|---|
| 1,275,036 | 8/1968 | Germany | 423/547 |

*Primary Examiner*—Charles N. Hart
*Assistant Examiner*—Benoit Castel
*Attorney, Agent, or Firm*—Brooks Haidt Haffner & Delahunty

[57] ABSTRACT

A process for treating a waste liquor from a hydrosulfite process by an activated sludge process is improved by aerating the waste in the presence of a metal ion before the activated sludge process.

8 Claims, 1 Drawing Figure

PROCESS FOR TREATING A WASTE LIQUID OF HYDROSULFITE

BACKGROUND OF THE INVENTION

1. Field of the Invention

This invention relates to a process for treating a waste liquor from hydrosulfite production process. More particularly, this invention relates to a process for treating the waste liquor comprising aerating the waste liquor to remove reducing inorganic sulfur compounds from the waste liquor and then applying an activated sludge process to the waste liquor. In this invention, by "hydrosulfite" is meant a alkali metal dithionite.

2. Description of the Prior Art

The waste liquor mentioned herein, is a waste liquor resulting from removal of a final product, anhydrous hydrosulfite, and a solvent from a reaction mixture in the process of producing anhydrous hydrosulfite by using sodium formate, alkali metal compounds, and sulfur dioxide such as the processes of U.S. Pat. Nos. 2,010,615 and 3,411,875 and British Patent No. 1,148,248. The waste liquor contains sodium thiosulfate, sodium sulfite, acid sodium sulfite, other unknown reducing inorganic sulfur compounds represented by the formula $$Na_xS_yO_z$$

where $x$, $y$ and $z$ are positive numbers, sodium formate and the like. Thus, if this waste liquor is directly disposed of, it becomes BOD and COD sources to cause water pollution. Therefore, some treatment should be applied before disposing of the waste liquor.

In general, the activated sludge process is known as a most effective method for treating waste liquor containing hydrophilic organic compounds and is used in various fields. For example, a waste liquor containing inorganic reducing substances such as sodium thiosulfate, sodium sulfite, and acid sodium sulfite and sodium formate can be effectively treated.

However, the present inventors have found that a conventional activated sludge process is not effective for treating hydrosulfite waste liquor. This seems to be due to unknown reducing substances present in the waste liquor from hydrosulfite process in addition to the above mentioned substances.

When a conventional activated sludge process is directly applied to the hydrosulfite waste liquor, BOD can not be sufficiently removed even if the waste liquor is diluted to a great extent, and further, the activated sludge itself becomes fine particles and is carried into the effluent without forming desirable floc, and therefore, a complete waste liquor treatment is not possible.

SUMMARY OF THE INVENTION

According to the present invention, the waste liquor is aerated at 30° – 85°C in the presence of 10 – 1000 ppm. of a metal ion such as iron, manganese, cobalt, copper and nickel ions. And then an activated sludge process is applied to the resulting waste liquor.

An object of the present invention is to provide an improved activated sludge process for treating such waste liquor.

DESCRIPTION OF THE PREFERRED EMBODIMENTS

Figure 1:
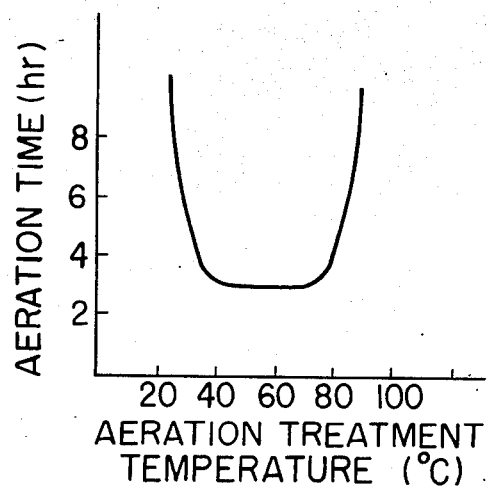
FIG. 1 shows a relation between the aeration treatment temperature and aeration time in the present invention.

The waste liquor to be treated by the process of the present invention is preferably diluted with water to give an iodine consumption of 1 – 15%. By "iodine consumption" is meant in this invention the following weight %:

$$\frac{\text{Weight of iodine consumed by waste liquor}}{\text{Weight of waste liquor}} \times 100\%$$

The higher the concentration of reducing substances in the waste liquor, the more the iodine consumption.

The metal ions used in the present invention are iron, manganese, cobalt, copper and nickel ions. Among them, iron and manganese ions are preferred.

These metal ions may be added in a form of metal salt such as, for example, sulfate, chloride, nitrate and the like.

Representative metal salts may be ferric sulfate, ferric chloride, ferric nitrate, manganic sulfate, manganic chloride, manganic nitrate, cobalt sulfate, cobalt chloride, cobalt nitrate, copper sulfate, copper chloride, copper nitrate, nickel sulfate, nickel chloride, nickel nitrate and the like.

The metal ions may be used either alone or in combination. Concentration of the metal employed is usually 10 – 1000 ppm., preferably 50 – 1000 ppm. When the concentration of metal ion is lower than 10 ppm., the effect of aeration is markedly low or hardly recognized.

A gas used in the aeration may be molecular oxygen or a gas containing molecular oxygen, preferably with air.

The aeration temperature may range from 30°C to 85°C, preferably with from 40°C to 70°C. Referring to FIG. 1, the abscissa is aeration temperature (°C) and the ordinate is aeration time (hr.). The curve shows a relation between the aeration temperature and the aeration time to attain a removal efficiency of iodine consumption of higher than 90% when manganese sulfate was used at a concentration of 60 ppm. and air was supplied at a superficial velocity in a column of 60 Nm³/m²H. As is clear from FIG. 1, the velocity of oxidizing the reducing inorganic sulfur compounds is decreased to a great extent at temperatures lower than 30°C and higher than 85°C. For example, at 20°C the oxidation velocity is about 1/5 of that at 40°C.

The aeration time may be appropriately selected taking various other conditions into consideration.

The aeration may be carried out by reaction apparatus of various types, preferably with a tower type reactor. The superficial velocity in a column of air is usually higher than 10 Nm³/m²H, preferably 40 – 200 Nm³/m²H.

The hydrosulfite waste liquor is aerated under the above mentioned conditions.

It is preferred to select the aeration conditions so as to attain a removal efficiency of iodine consumption of higher than 50%, and preferably above 60%. When the removal efficiency of iodine consumption is lower than 50%, the floc is broken and thereby the activated sludge procedure becomes difficult. And when the removal efficiency of iodine consumption is lower than 60%, the load on the activated sludge treatment becomes unduly large. The load of the activated sludge treatment may be represented by BOD loading which indicates how much BOD is to be charged per unit volume of the activated sludge vessel and unit time.

The waste liquor treated by aeration may be diluted with water to 5 – 10 times. Ammonium sulfate and phosphoric acid are added to the liquor the ratio of BOD : N : P being preferably 100 : 5 : 1. The resulting liquor is treated by an activated sludge process.

In general, an activated sludge treatment is effected at a BOD loading of 1.0 – 2.0 Kg/m$^3$-d and MLSS of 3000 – 5000 ppm. It is usually considered that a BOD loading of lower than 1.0 Kg/m$^3$-d is commercially disadvantageous.

According to the present invention, the activated sludge does not assume fine particle form and can form good floc and thereby a complete waste liquor treatment is possible. In other words, even if the BOD loading is 1.5 Kg/m$^3$-d, an excellent result can be obtained and the BOD removal efficiency can be more than 95%.

In the present invention, MLSS (Mixed Liquor of Suspended Solid) means a concentration of floc in an activated sludge vessel and SVI (Sludge Volume Index) means a compaction volume per g. of activated sludge after the suspended liquor of the activated sludge has stood still for 30 minutes and the unit is cc/g.

The following examples are given for illustrating the present invention, but by no means for limiting the present invention.

EXAMPLE 1

A waste liquor from a hydrosulfite production process (sodium formate 12%, iodine consumption 20%) 100l was mixed with 100l of water. To the resulting mixture was added 50g of FeCl$_3$.6H$_2$O and the liquor was fed to the top of a bubble column of 100 mm in inner diameter and 3000mm high at a rate of 6l/hr. and the liquor was continuously discharged from the bottom of the column. Air was supplied from the bottom of the column through a diffuser at a rate of 40 Nm$^3$/m$^2$H (as a superficial velocity in the column). Aeration temperature was kept at 60°C. Iodine consumption of the liquor decreased from 10% to 0.5% and the removal efficiency of iodine consumption was 95%. Then the liquor was diluted to 20 times, and ammonium sulfate and phosphoric acid were added to the liquor. The resulting liquor was subjected to an activated sludge treatment at MLSS 3000 ppm. and BOD loading 1.5 Kg/m$^3$-d. The result is shown in Table 1 below. The resulting liquor was clear and SVI was 70.

Table 1

|  | Before treatment by the activated sludge process | After treatment by the activated sludge process |
| --- | --- | --- |
| BOD | 1500 ppm. | 60 ppm. |
| COD (KMnO$_4$) | 1200 | 100 |
| COD (K$_2$Cr$_2$O$_7$) | 2800 | 260 |
| Iodine consumption | 250 | 0 |

EXAMPLE 2

A waste liquor from a hydrosulfite production process (sodium formate 12%, iodine consumption 20%) 100l was mixed with 150l of water, and 80g of MnSO$_4$.H$_2$O was added to the liquor. The resulting liquor was fed to a bubble column of 100 mm in inner diameter and 3000 mm high at a rate of 8l/hr. from the bottom of the column and overflowed from the top of the column. Air was supplied from the bottom of the column through a diffuser at a rate of 70Nm$^3$/m$^2$H (as a superficial velocity in the column tower). Aeration temperature was kept at 40°C during the operation. Iodine consumption of the overflowing liquor was 0.2%. The resulting liquor was diluted to 15 times, and ammonium sulfate and phosphoric acid were added to the liquor. The resulting liquor was subjected to an activated sludge treatment at MLSS 4000 ppm. and BOD loading 1.6Kg/m$^3$-d. The result is shown in Table 2 below. The liquor thus treated was clear and SVI was 90.

Table 2

|  | Before treatment by the activated sludge process | After treatment by the activated sludge process |
| --- | --- | --- |
| BOD | 1600 ppm. | 40 ppm. |
| COD (KMnO$_4$) | 1200 | 90 |
| COD (K$_2$Cr$_2$O$_7$) | 2700 | 240 |
| Iodine consumption | 130 | 0 |

Comparison Example 1

A waste liquor from a hydrosulfite production process (sodium formate 12%, iodine consumption 20%) was diluted to 40 times, and ammonium sulfate and phosphoric acid were added to the liquor.

The resulting liquor was subjected to an activated sludge consumption at MLSS 3000 ppm. The floc was broken at BOD loading of 0.4 Kg/m$^3$-d and the fine sludge was carried over with the effluent. BOD, COD and iodine consumption were as shown in Table 3 below.

Table 3

|  | Before treatment by the activated sludge process | After treatment by the activated sludge process |
| --- | --- | --- |
| BOD | 1500 ppm. | 610 ppm. |
| COD (KMnO$_4$) | 1500 | 680 |
| COD (K$_2$Cr$_2$O$_7$) | 3000 | 1550 |
| Iodine consumption | 5000 | 1320 |

Comparison Example 2

A waste liquor from a hydrosulfite production process (sodium formate 12%, iodine consumption 20%) 100l was mixed with 100l of water, and 50 g of FeCl$_3$.6H$_2$O) was added to the liquor. The resulting liquor was fed to the top of a bubble column of 100 mm in inner diameter and 3000 mm high at a rate of 2l/hr while air is blown to the tower from the bottom through a diffuser at a rate of 40Nm$^3$m$^2$H. The liquid was continuously drawn from the bottom of the tower. The inside of the tower was kept at 20°C. After the treatment, iodine consumption of the resulting liquid was 8%. Hence this liquid was not suitable for being subjected to an activated sludge process, with or without dilution.

Comparison Example 3

A waste liquor from a hydrosulfite production process (sodium formate 12%, iodine consumption 20%) 100l was mixed with 100l of water, and then 18l of the resulting mixture was fed to a bubble column of 100 mm in inner diameter and 3000 mm high without adding any catalyst while air was blown to the bubble column from the bottom of the tower through a diffuser at a rate of 40Nm³/m²H (as a linear velocity in the ampty tower). The inside of the tower was kept at 60°C. After 24 hours, iodine consumption in the liquid in the tower was 9.8% and even after 48 hours, it was the same as above. This liquid was naturally unsuitable for being subjected to an activated sludge process, with or without dilution.

EXAMPLE 3

A waste liquor from a hydrosulfite production process (sodium formate 12%, iodine consumption 20%) 100l was mixed with 100l of water, and 100 g of CuSO$_4$.5H$_2$O was added to the liquor. The procedure of Example 1 was repeated except the resulting liquor was fed to the bottom of the same bubble column at a rate of 8l/hr and the liquor was continuously discharged from the top of the column. Air was supplied from the bottom of the column through a diffuser at a rate of 70 Nm³m²H (as a superficial velocity in the column). The aeration temperature was kept at 40°C. Iodine consumption of the overflowing liquor was 2%. The liquor was diluted to 20 times, and ammonium sulfate and phosphoric acid were added to the liquor. The resulting liquor was subjected to an activated sludge treatment at MLSS 4000 ppm. and BOD loading 1.3 Kg/m³-d. The result is shown in Table 4 below. The liquor thus treated was clear and SVI was 85.

Table 4

|  | Before treatment by the activated sludge process | After treatment by the activated sludge process |
|---|---|---|
| BOD | 1600 ppm. | 100 ppm. |
| COD (KMnO$_4$) | 1500 | 150 |
| COD (K$_2$Cr$_2$O$_7$) | 3000 | 350 |
| Iodine consumption | 1000 | 0 |

EXAMPLE 4

A waste liquor from a hydrosulfite production process (sodium formate 12%, iodine consumption 20%) 100l was mixed with 100l of water, and 30 g of FeCl$_3$.6H$_2$O and CoCl$_3$ 30 g were added to the liquor. The resulting liquor was fed to the top of the same bubble column as in Example 1 at a rate of 15l/hr, and the liquor was continuously discharged from the bottom of the column. Air was supplied from the bottom of the column through a diffuser at a rate of 40Nm³/m²H (as a superficial velocity in the column). The aeration temperature was kept at 60°C. Iodine consumption of the discharged liquor was 0.1%. The liquor can be effectively treated by the activated sludge process as in Example 3.

EXAMPLE 5

A waste liquor from a hydrosulfite production process (sodium formate 12%, iodine consumption 20%) 100l was mixed with 100l of water, and 200 g of NiSO$_4$ was added to the liquor. The procedure in Example 1 was followed except the resulting liquor was fed to the bottom of the same bubble column at a rate of 5l/hr, and the liquor was continuously discharged from the top of the column. Air was supplied from the bottom of the column through a diffuser at a rate of 70Nm³/m²H (as a superficial velocity in the column). The aeration temperature was kept at 40°C. Iodine consumption of the discharged liquor was 2.3%. The liquor can be effectively treated by the activated sludge process as in Example 3.

We claim:

1. In a process for treating a waste liquor from the final stage of a process for producing anhydrous hydrosulfite wherein the waste liquor includes sodium thiosulfate, sodium sulfite, sodium acid sulfite, sodium formate, and inorganic sulfur reducing compounds, the improvement which comprises diluting the waste liquor with water to adjust the ratio of 100 percent times the weight of iodine consumed by the waste liquor divided by the weight of waste liquor to one to fifteen percent, aerating the waste liquor at 30°–85°C in the presence of 10 to 1000 parts per million of a metal ion selected from the group consisting of iron, manganese, cobalt, copper and nickel ions to reduce the ratio by more than 50%, and treating the aerated liquor by an activated sludge process.

2. A process according to claim 1, in which the metal ion is selected from the group consisting of iron and manganese ions.

3. A process according to claim 1, in which the concentration of the metal ion ranges from 50 to 1000 ppm.

4. A process according to claim 1, in which the aerating temperature ranges from 40° to 70°C.

5. A process according to claim 1, in which the aeration is carried out in tower type reactor.

6. A process according to claim 1, in which the aeration is carried out so that the ratio of the weight of iodine consumed by the waste liquor to the weight of waste liquor is reduced by more than 60%.

7. In a process for treating waste liquor from the final stage of a process for producing anhydrous alkali metal hydrosulfite wherein the waste liquor includes sodium thiosulfate, sodium sulfite, sodium acid sulfite, sodium formate, and inorganic sulfur reducing compounds, the improvement comprising diluting the waste liquor with water to adjust the ratio of 100% times the weight of iodine consumed by the waste liquor divided by the weight of waste liquor to 1 to 15%, aerating the diluted waste liquor at 30° to 85°C in the presence of from 10 to 1000 parts per million of a metal ion selected from the group consisting of iron and manganese ions to reduce the ratio by more than 50%, and treating the aerated liquor by an activated sludge process.

8. In a process for treating a waste liquor from the final stage of a process for producing anhydrous alkali metal hydrosulfite wherein the waste liquor includes sodium thiosulfate, sodium sulfite, sodium acid sulfite, sodium formate and inorganic sulfur reducing compounds, the improvement comprising diluting the waste liquor with water to adjust the ratio of 100% times the weight of iodine consumed by the waste liquor divided by the weight of waste liquor to 1 to 15%, aerating the diluted waste liquor at 40° to 70°C in the presence of 50 to 1000 parts per million of a metal ion selected from the group consisting of iron and manganese ions to reduce the ratio by at least 60%, and treating the aerated liquor by an activated sludge process.

* * * * *

UNITED STATES PATENT OFFICE
CERTIFICATE OF CORRECTION

PATENT NO. : 3,962,073
DATED : June 8, 1976
INVENTOR(S) : YOSHIO YOSHIKAWA ET AL It is certified that error appears in the above-identified patent and that said Letters Patent are hereby corrected as shown below:

Column 3, line 40, change "100l" (both occurrences) to --100ℓ--; line 43, change "6l/hr." to --6ℓ/hr.--.

Column 4, line 5, change "100l" to --100ℓ-- and "150l" to --150ℓ--; line 8, change "8l/hr." to --8ℓ/hr.--; line 58, change "100l" (both occurrences) to --100ℓ--; line 61, change "2l/hr" to --2ℓ/hr--; line 63, change "40Nm³m²H" to --40Nm³/m²H--.

Column 5, line 5, change "100l" (both occurrences) to --100ℓ-- and "18l" to --18ℓ--; line 21, change "100l" (both occurrences) to --100ℓ--; line 25, change "8l/hr" to --8ℓ/hr.--; line 28, change "70Nm³m²H" to --70Nm³/m²H--; line 51, change "100l" (both occurrences) to --100ℓ--; line 54, change "15l/hr" to --15ℓ/hr--; line 67, change "100l" (both occurrences) to --100ℓ--.

Column 6, line 2, change "5l/hr." to --5ℓ/hr.--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*